US006238199B1

(12) United States Patent
Schallenmueller et al.

(10) Patent No.: US 6,238,199 B1
(45) Date of Patent: May 29, 2001

(54) MULTI-PURPOSE PRESS FOR PRODUCING FORMED PARTS

(75) Inventors: Karl-Heinz Schallenmueller, Auenstein; Gerd Weinberg, Oberstenfeld; Helmuth Huber, Gronau, all of (DE)

(73) Assignee: Werzalit AG + Co., Oberstenfeld (DE)

( * ) Notice: Subject to any disclaimer, the term of this patent is extended or adjusted under 35 U.S.C. 154(b) by 0 days.

(21) Appl. No.: 09/312,082

(22) Filed: May 15, 1999

(30) Foreign Application Priority Data

May 15, 1998 (EP) ........................................ 98108869

(51) Int. Cl.[7] ........................................ B29C 35/00

(52) U.S. Cl. ........................................ 425/401; 425/420

(58) Field of Search ........................................ 425/401, 416, 425/420, 399, 812; 249/141; 100/127

(56) References Cited

U.S. PATENT DOCUMENTS 5,078,938 * 1/1992 Monk et al. ........................ 264/109

FOREIGN PATENT DOCUMENTS 0 443 053 A1 8/1991 (EP) .

* cited by examiner

*Primary Examiner*—Harold Pyon
*Assistant Examiner*—Joseph S. Del Sole
(74) *Attorney, Agent, or Firm*—Michael J. Striker

(57) ABSTRACT

A device for producing formed parts of a not freely flowable mixture of chip and/or fiber materials and a heat-hardenable binders has a first stationary pressing tool part, a second pressing tool part vertically moveable relative to the first pressing tool part, one of the pressing tool part forming a filling chamber and being provided with guiding passages for evaporation of the mixture, and a blocking element means provided for blocking of the guiding passages.

7 Claims, 2 Drawing Sheets

MULTI-PURPOSE PRESS FOR PRODUCING FORMED PARTS

BACKGROUND OF THE INVENTION

The present invention relates generally to a device for producing formed or molded parts from a not freely-flowing mixture of heat and/or fiber materials and heat-hardenable binders.

More particularly, it relates to a device of the above mentioned type which has a pressing tool lower part, and a pressing tool upper part which is vertically guided on the pressing tool lower part, with the pressing tool upper part being frame-shaped, surrounding a filling chamber, and being closable by a cover, with supply passages provided in the walls directed toward the filling chamber.

Such devices are known in the art. One of such devices is disclosed for example in the European patent document EP-A-0 443 053. In the production of the formed parts in this arrangement from the above mentioned mixture, hot gasses or vapors introduced in the pressing tool are evaporated from a mixture before pressing. The mixture before the pressing of the formed parts must be simultaneously relieved from the hot gasses or vapors. During the production of the formed parts conventionally due to the different forms, different pressing tool lower parts and pressing tool upper parts are required, to form a corresponding filling chamber in filling condition. It is however advantageous when the same press can be used for pressing of different formed parts, with the design which is identical and having for example only different thicknesses.

SUMMARY OF THE INVENTION

Accordingly, it is an object of the present invention to provide a multi-purpose press which is improved so that the same tool can be used for producing of formed parts having different heights.

In keeping with these objects and with others which will become apparent hereinafter, one feature of present invention resides, briefly stated in an arrangement for producing formed parts of the above mentioned general type, in which on the outer side of the pressing tool lower part a blocking device for guiding passages connected with it is arranged.

When the press is designed in accordance with the present invention, the filling chamber which receives the mixture corresponds to the thickness of a formed part to be pressed, and when not needed the supply passages of hot gasses or vapors are closed.

In accordance with another feature of the present invention, the blocking device is formed as at least one plate which abuts against a part of the inner surface of the pressing tool upper part.

In accordance with still a further feature of the present invention the plate is supported against the pressing tool lower part by a spring.

Finally in accordance with still another feature of present invention, the blocking device is composed of a sealing plunger arranged in a collecting conduit for the guiding passages.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1A:
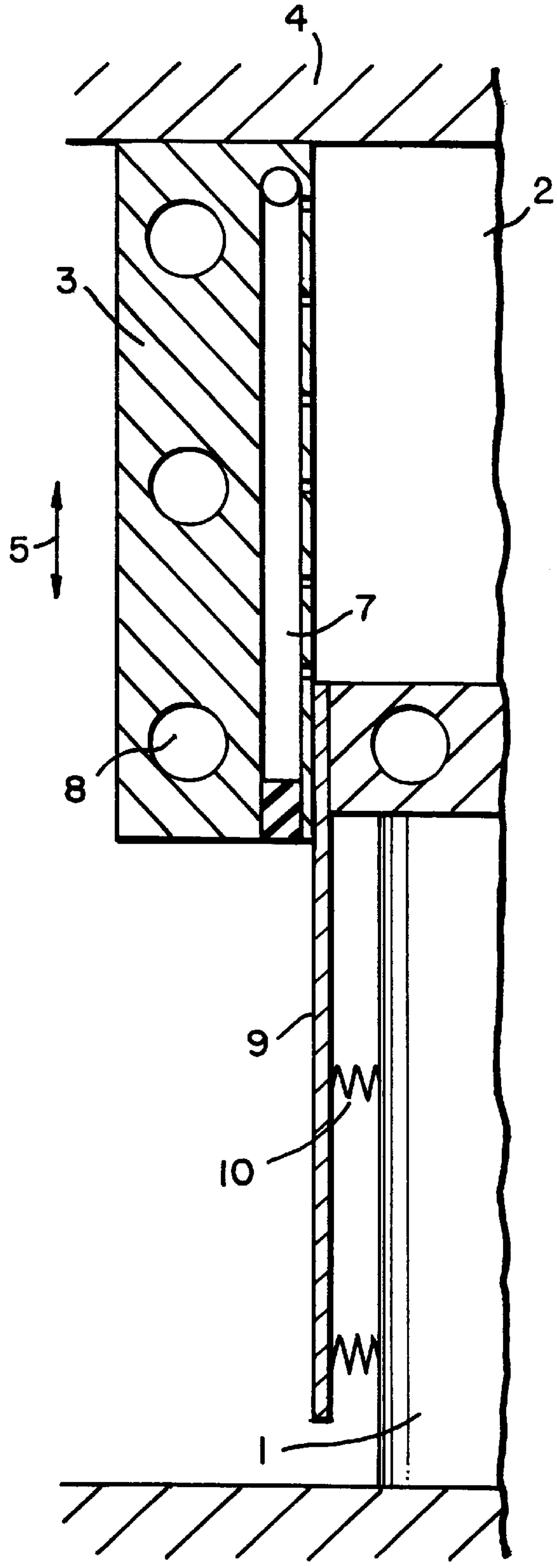
FIG. 1 is a view schematically showing a longitudinal section of a device in accordance with the present invention with one deep filling chamber and another less deep filling chamber.
Figure 1B:
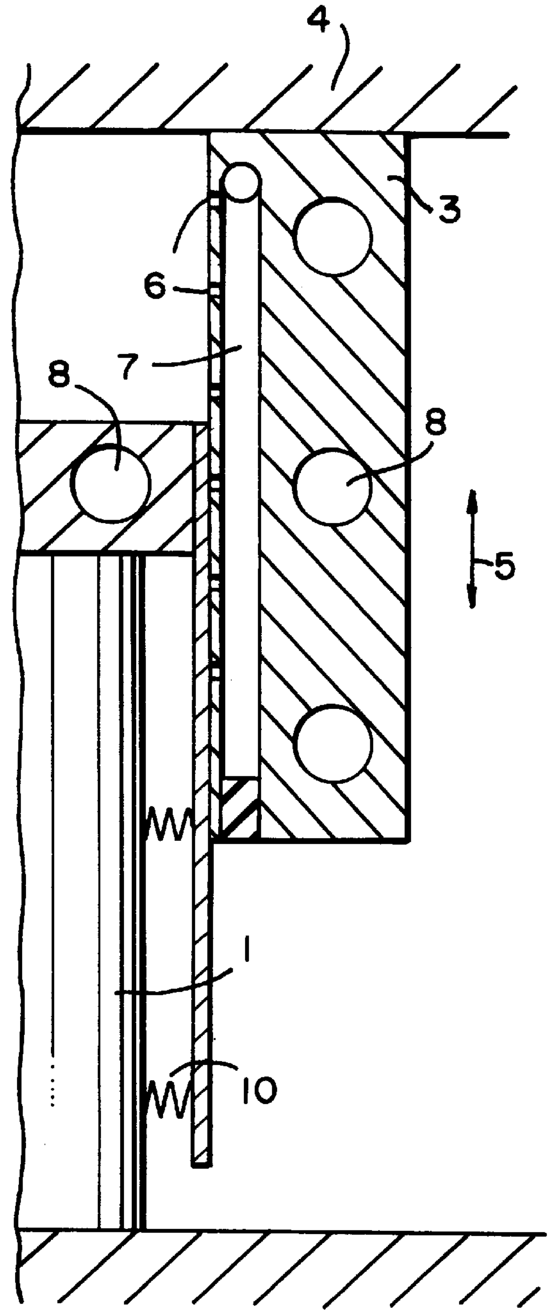
Figure 2A:
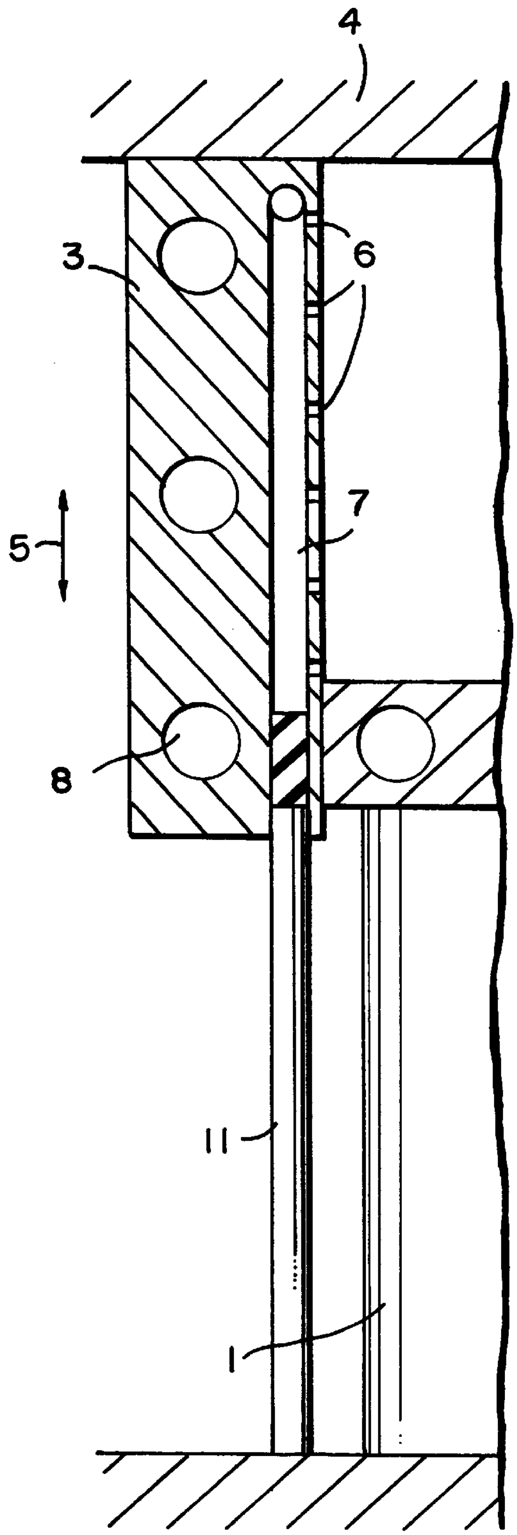
FIG. 2 is a view schematically showing a longitudinal section of the inventive device in accordance with another embodiment of the present invention with one deep filling chamber and another less deep filling chamber.
Figure 2B:
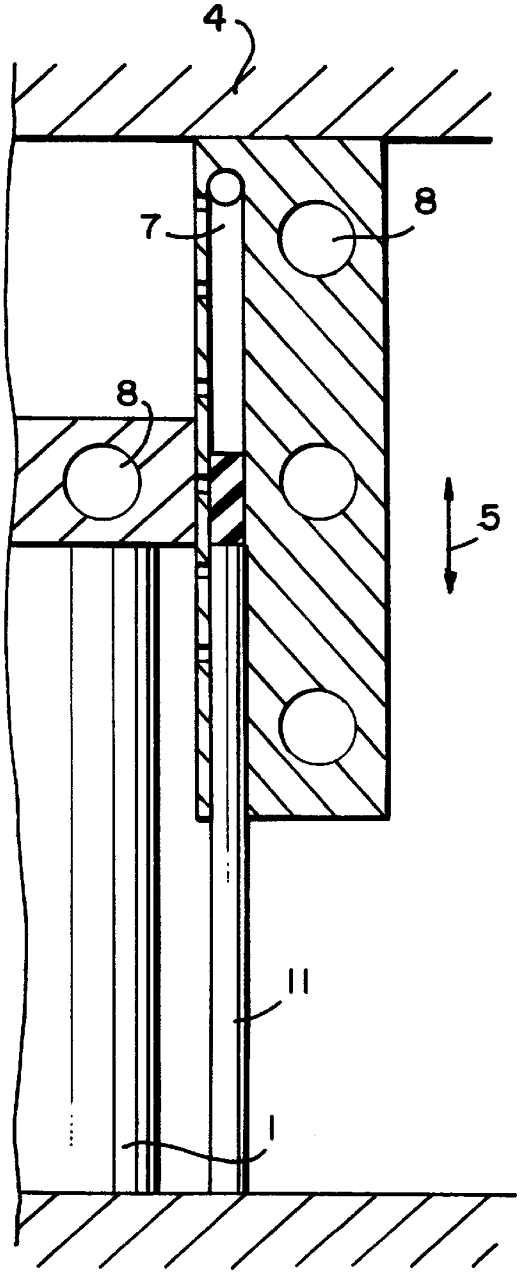

FIGS. 1 and 2 show correspondingly different halves of a same press, and in particular a left half (a) and a half (b).

The press has a pressing tool lower part 1. It further has a pressing tool upper part 3 which is vertically guided on the pressing tool lower part 1. The pressing tool upper part 3 is frame-shaped and surrounds a filling chamber 2. It is closeable by a cover 4 and is vertically displaceable as identified with the arrows 5. Guiding passages 6 are provided in the walls of the pressing tool upper part for hot gasses. They are connected with a collecting conduit 7. The heaters for generating the heat required during pressing of the formed parts are identified with reference numerals 8.

A blocking device for the guiding passages 6 is arranged on the outer side of the pressing tool lower part 1. In the embodiment shown in FIG. 1 the blocking device is composed of a plate 9 which is connected with the pressing tool lower part 1. The plate 9 is pressed against the inner surface of the pressing tool upper part 3, for example by pressure springs 10.

As can be seen from FIG. 1, the pressing tool lower part 1 and the pressing tool upper part 3 in the left part of the press (a) assumes such a position, that a great filling chamber 2 is formed. The plate 9 assumes such a position that all guiding passages 6 can take part in evaporation in the mixture available in the filling chamber 2.

In the right part of the press (b) the filling chamber 3 has a lower filling height because of the vertical lowering of the pressing tool upper part 3. Those guiding passages 6 which are not required for evaporation of the mixture are closed by the plate 9.

In the device shown in FIG. 2, the parts of the press which correspond to the parts shown in FIG. 1 are identified with the same reference numerals.

The press shown in FIG. 2 differs from the press shown in FIG. 1 by the construction of the blocking device. In the embodiment shown in FIG. 2, instead of the plate 9, a vertical displaceable sealing plunger 11 is provided in the collecting conduit 7. The sealing plunger 11 can be either rigidly coupled with the pressing tool lower part or can be separately displaceable. The sealing plunger 11 similarly to the plate 9, closes corresponding guiding passages 6.

It will be understood that each of the elements described above, or two or more together, may also find a useful application in other types of constructions differing from the types described above.

While the invention has been illustrated and described as embodied in multi-purpose press for producing formed parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A device for producing formed parts of a not freely flowable mixture of chip and/or fiber materials and heat-hardenable binders, comprising a first stationary pressing tool lower part; a second pressing tool part vertically movable relative to said first pressing tool part, one of said pressing tool parts forming a filling chamber and being provided with guiding passages for evaporation of the mixture; heaters in the first and second parts; and blocking means for blocking of said guiding passages.

2. A device as defined in claim 1, wherein said second pressing tool part is a frame-shaped pressing tool part.

3. A device as defined in claim 1, wherein said one pressing tool part has a plurality of walls provided with said guiding passages.

4. A device as defined in claim 1, wherein said blocking means is arranged on and connected to an outer side of said one pressing tool part.

5. A device as defined in claim 1, wherein said second movable pressing tool part has a collecting conduit communicating with said guiding passages, said blocking means including a sealing plunger arranged in said collecting conduit.

6. A device as defined in claim 1, wherein said blocking means include at least one plate which is applied on a part of an inner surface of said second movable pressing tool part.

7. A device as defined in claim 6, and further comprising spring means for urging said plate against said movable pressing tool part.

* * * * *